US008813886B2

(12) United States Patent
Nishikawa et al.

(10) Patent No.: US 8,813,886 B2
(45) Date of Patent: Aug. 26, 2014

(54) VEHICLE EQUIPPED WITH DRIVING MOTOR

(75) Inventors: Yutaka Nishikawa, Wako (JP); Takeshi Kimishima, Wako (JP); Hisashi Matsuo, Wako (JP); Kazuma Morimitsu, Wako (JP); Yui Tadano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 15 days.

(21) Appl. No.: 13/636,213

(22) PCT Filed: Mar. 26, 2010

(86) PCT No.: PCT/JP2010/055439
§ 371 (c)(1),
(2), (4) Date: Sep. 20, 2012

(87) PCT Pub. No.: WO2011/118036
PCT Pub. Date: Sep. 29, 2011

(65) Prior Publication Data
US 2013/0009451 A1    Jan. 10, 2013

(51) Int. Cl.
| B60K 7/00 | (2006.01) |
| H02K 7/14 | (2006.01) |
| H02K 5/173 | (2006.01) |
| H02K 15/16 | (2006.01) |
| B62K 11/04 | (2006.01) |
| H02K 21/22 | (2006.01) |
| H02K 5/10 | (2006.01) |

(52) U.S. Cl.
CPC ............ *H02K 15/16* (2013.01); *H02K 7/14* (2013.01); *H02K 2201/03* (2013.01); *H02K 21/22* (2013.01); *H02K 5/1737* (2013.01); *H02K 5/10* (2013.01); *B62K 11/04* (2013.01)
USPC ..................... 180/65.51; 180/220; 301/6.5

(58) Field of Classification Search
USPC ....... 180/218, 220, 65.51; 301/6.5; 310/67 A, 310/67 R
See application file for complete search history.

(56) References Cited

U.S. PATENT DOCUMENTS

| 5,767,601 A * | 6/1998 | Uchiyama .................. 310/190 |
| 6,199,651 B1 * | 3/2001 | Gay .............................. 180/220 |

(Continued)

FOREIGN PATENT DOCUMENTS

| JP | 2008-057552 A | 3/2008 |
| JP | 2009-159791 A | 7/2009 |

OTHER PUBLICATIONS

International Search Report dated Jun. 8, 2010 corresponding to International Patent Application No. PCT/JP2010/055439.

*Primary Examiner* — John Walters
*Assistant Examiner* — Brian Swenson
(74) *Attorney, Agent, or Firm* — Squire Patton Boggs (US) LLP

(57) ABSTRACT

A wheel is provided with a motor having a stator and a rotor and has with a fixed-side member supporting the stator and a rotative-side member receiving rotation transmitted from the rotor. The wheel is supported between a pair of arms with a wheel axle. An axle rotatively supports the rotor and the rotative-side member. An engaging part is provided for engagement with the fixed-side member to position the center of rotation of the rotative-side member with respect to the fixed-side member. The fixed-side member and the rotative-side member are integrated by engagement of the engaging part with the fixed-side member. This configuration allows the axle to be positioned with respect to the fixed-side member, such that the centers of holes in the axle and the fixed-side member for insertion of the wheel axle will be in alignment. The unit U is then incorporated in between the pair of arms.

6 Claims, 5 Drawing Sheets

(56) References Cited

U.S. PATENT DOCUMENTS

| | | |
|---|---|---|
| 7,105,965 B2* | 9/2006 | Mantovani .................. 310/75 C |
| 7,249,643 B2* | 7/2007 | Etzioni et al. ............. 180/65.51 |
| 7,717,203 B2* | 5/2010 | Yoshino et al. ............ 180/65.51 |
| 8,245,804 B2* | 8/2012 | van Rooij .................. 180/65.51 |
| 2007/0257570 A1* | 11/2007 | Walter et al. ................. 310/67 R |
| 2012/0161495 A1* | 6/2012 | Ito .................................. 301/6.5 |

* cited by examiner

VEHICLE EQUIPPED WITH DRIVING MOTOR

TECHNICAL FIELD

This invention relates to a vehicle equipped with a driving motor. More particularly, it relates to a vehicle with a driving motor incorporated in a wheel.

BACKGROUND ARTS

As one prior art, a vehicle equipped with a driving motor as described in the Patent document 1, for instance, is known. Referring to the above prior art with reference to numerals shown in FIGS. 2 and 3 in the above Patent document, the vehicle equipped with the driving motor as described is such that a wheel (40) provided therein with a motor (20) having a stator (21) and a rotor (22) and equipped with a fixed-side member (11) supporting the stator (21) and a rotative-side member (42) receiving rotation transmitted from the rotor (22) is supported between a pair of front forks (5) and (5) with a wheel axle (49).

LITERATURE ON PRIOR ARTS

Patent Document

Patent document 1: Japanese Patent Laid-open Publication No. 2009-159791

SUMMARY OF THE INVENTION

Problems to be Solved by the Invention

For the above prior art, the fixed-side member (11) supporting the stator (21) is supported with the wheel axle (49), the rotor (22) is supported with the wheel axle (49) through an axle (24), and the rotative-side member (42) receiving rotation transmitted from the rotor (22) is supported with the wheel axle (49) through a bearing (47), in which case, however, the axle (24) has no engaging part for engagement with the fixed-side member (11). For that reason, the above prior art involves the occurrence of mutual misalignment of insertion holes in the fixed-side member (11) and the axle (24) when inserting the wheel axle (49) into the fixed-side member (11) and the axle (24). Such situation, when occurred, meets with the difficulty of inserting the wheel axle (49), and as a result, incorporation of the wheel in between the front forks (5) and (5) becomes hard to be effected.

An object of the present invention for solving the above problems is to provide a vehicle equipped with a driving motor, in which incorporation of a wheel in between a pair of arms may be effected easily.

Means for Solving the Problems

To solve the above problems, a vehicle equipped with a driving motor of the present invention, more specifically, a vehicle equipped with a driving motor, in which a wheel provided therein with a motor having a stator and a rotor and equipped with a fixed-side member supporting the above stator and a rotative-side member receiving rotation transmitted from the above rotor is supported between a pair of arms with a wheel axle, is characterized in that on an axle are rotatively supported the above rotor and the rotative-side member, and there is provided at the above axle an engaging part for engagement with the above fixed-side member to position the center of rotation of the rotative-side member with respect to the above fixed-side member, wherein the above rotative-side member and the fixed-side member are integrated into a unit by engagement of the engaging part of the axle with the above fixed-side member, the unit of which is supported between the above pair of arms with the above wheel axle.

It is preferable that the above rotor is supported with the above rotative-side member.

It is more preferable that the above rotative-side member has a sleeve rotatively supported on the above axle and a flange provided on the outer circumference of the sleeve, wherein to the flange is fastened the above rotor, and the above sleeve is formed more projecting with respect to an axial direction thereof than a part where the above rotor is fastened, a projection of which is supported on the above axle through a bearing.

It is also more preferable that the above rotor is of the form of an outer rotor located on the outer circumference of the above stator, and the above stator is of a doughnut form having a space in the center of the stator, wherein in the above space is disposed the projection of the sleeve included in the above rotative-side member.

It is also more preferable that the engaging part of the above axle is more projecting with respect to the axial direction toward the above fixed-side member than the projection of the sleeve included in the rotative-side member, wherein engagement of the above engaging part with the fixed-side member is provided before the above rotor and the stator are overlapped when bringing axially closer to each other the rotative-side member supporting the above rotor and the fixed-side member supporting the above stator.

It is further preferable that the above fixed-side member has a disk fixed to one of the above pair of arms and a cylindrical part so extending from the circumference of the disk to the rotative-side member side as to cover the above stator and the rotor, wherein an annular end of the cylindrical part and the above rotative-side member are brought into an overlap on the center line of the vehicle, an overlap portion of which is adapted to form a labyrinth seal.

It is more preferable that the above labyrinth seal is formed in such a manner that there is provided at an annular end of the above cylindrical part a step having a diameter increasing toward the rotative-side member side, while there are provided on the above rotative-side member an axially-extending irregularity and a radially-extending irregularity.

Effects of the Invention

According to the vehicle equipped with the driving motor of the present invention, there is provided, at the axle rotatively supporting the rotor and the rotative-side member, the engaging part for engagement with the fixed-side member to position the center of rotation of the rotative-side member with respect to the fixed-side member, so that integration of the fixed-side member and the rotative-side member into the unit by engagement of the engaging part with the fixed-side member is adapted to allow the axle to be positioned with respect to the fixed-side member, resulting in that the centers of the holes in the axle and the fixed-side member for insertion of the wheel axle will be in alignment.

Accordingly, operation of incorporating the unit (i.e., the wheel) in between the pair of arms becomes facilitated.

Also, the above rotor is supported with the above rotative-side member, so that it is possible to position also the center of rotation of the rotor with respect to the stator supported on the fixed-side member at the same time as positioning of the center of rotation of the rotative-side member with respect to the fixed-side member.

Further, the above rotative-side member is of the form having the sleeve rotatively supported on the above axle and the flange provided on the outer circumference of the sleeve, wherein to the flange is fastened the above rotor, and the above sleeve is formed more projecting with respect to the axial direction thereof than the part where the above rotor is fastened, the projection of which is supported on the above axle through the bearing, so that it is possible to support in a stable state the rotative-side member holding a tire and the above rotor.

Furthermore, the above rotor is of the form of the outer rotor located on the outer circumference of the above stator, and the above stator is of the doughnut form having the space in the center of the stator, wherein in the above space is disposed the projection of the sleeve included in the above rotative-side member, so that it is possible to provide a wheel size reduction by effectively taking advantage of the space in the center of the stator.

Furthermore, the engaging part of the above axle is formed more projecting with respect to the axial direction thereof toward the above fixed-side member than the projection of the sleeve included in the above rotative-side member, wherein engagement of the above engaging part with the fixed-side member is provided before the above rotor and the stator are overlapped when bringing axially closer to each other the rotative-side member supporting the above rotor and the fixed-side member supporting the above stator, so that it is possible to bring the engaging part into engagement with the fixed-side member before magnetic attraction produced between the rotor and the stator becomes increased, and consequently, integration into the above unit will be effected easily.

Also, the above fixed-side member is of the form having the disk fixed to one of the above pair of arms and the cylindrical part so extending from the circumference of the disk to the rotative-side member side as to cover the rotor and the stator, wherein the annular end of the cylindrical part and the above rotative-side member are brought into the overlap on the center line of the vehicle, so that it becomes possible to form the labyrinth seal in such a position that water or the like is hard to enter.

Further, the above labyrinth seal is formed in such a manner that there is provided at the annular end of the above cylindrical part the step having the diameter increasing toward the above rotative-side member side, while there are provided on the rotative-side member the axially-extending irregularity and the radially-extending irregularity, so that it is possible to provide an increased seal property.

MODE FOR EMBODYING THE INVENTION

One embodiment of a vehicle equipped with a driving motor according to the present invention will now be described with reference to the attached drawings.

Figure 1:
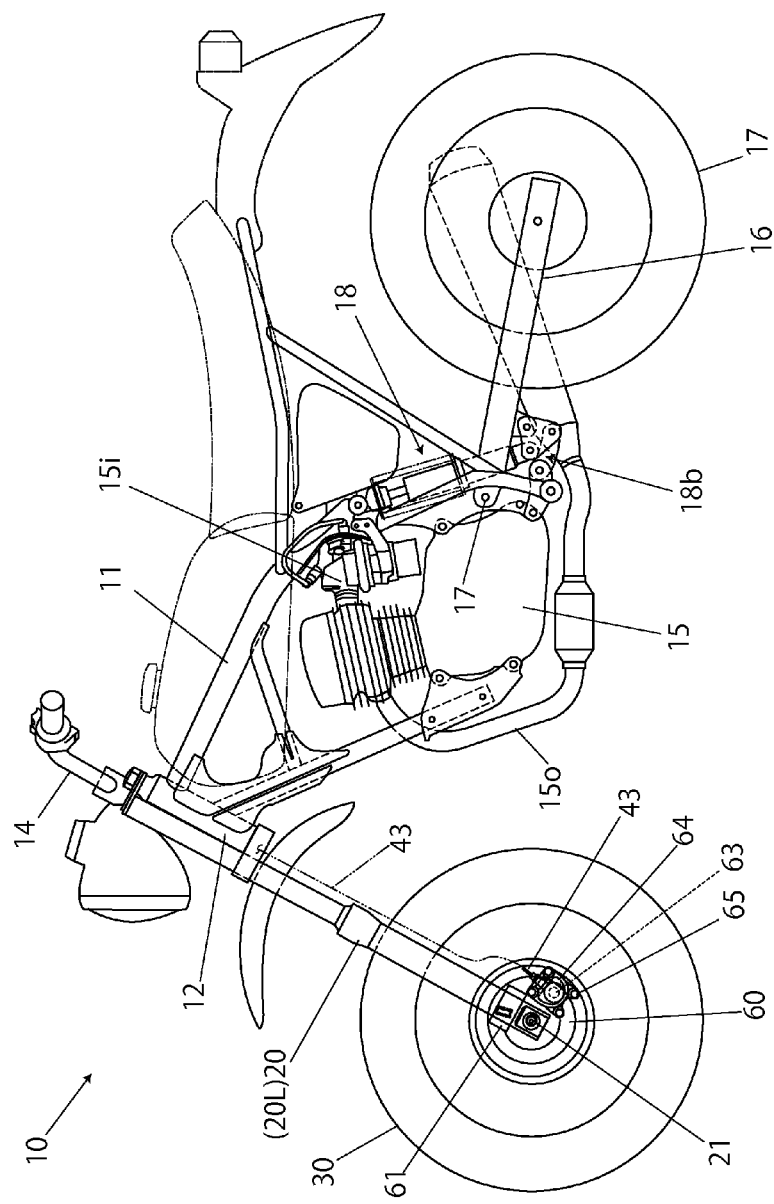
FIG. 1 is a side view showing one embodiment of a vehicle equipped with a driving motor according to the present invention.

Referring to FIG. 1, a vehicle 10 equipped with a driving motor according to this embodiment is of the form of a motorcycle and has a frame 11 forming a vehicle body. To a head pipe 12 forming the front end of the frame 11 is attached a pair of front forks 20 as a pair of arms so that they may be free to steer. To the tops of the front forks 20 is attached a bar handle 14. To the bottoms of the front forks 20 is attached a front wheel 30 as a wheel. To the inside of the frame 11 is fixed an engine 15. To the engine 15 are connected an intake system 15i and an exhaust system 15o. To the rear of the frame 11 is attached a pair of left and right swing arms 16 with a pivot shaft 17 so that they may be free to swing upward and downward. To the rear ends of the swing arms 16 is attached a rear wheel 17. The rear wheel 17 may be driven with the engine 15 through non-illustrated driving force transmitting means such as chain and drive shaft. Reference numeral 18 indicates a rear cushion unit, an upper end of which being connected to the top of the rear of the frame 11, and a lower end of which being connected to the bottom of the swing arm 16 and to the bottom of the rear of the vehicle body frame 11.

The motorcycle of this type is such that in addition to the rear wheel 17, the front wheel 30 is also formed as a drive wheel. There is further provided a braking device for the front wheel 30. The front wheel 30 is driven with a motor incorporated in the front wheel 30.

Figure 2:
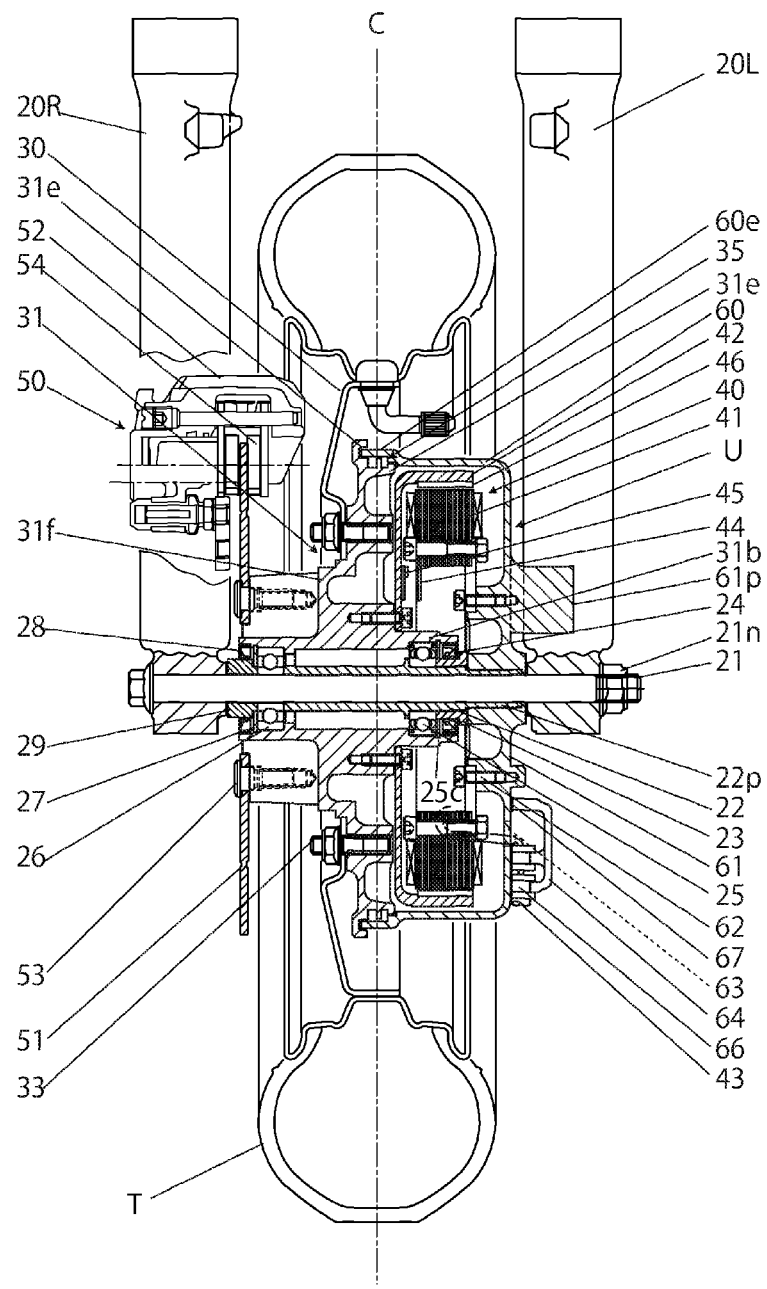
FIG. 2 is an elevation in section showing essential parts.
Figure 3:
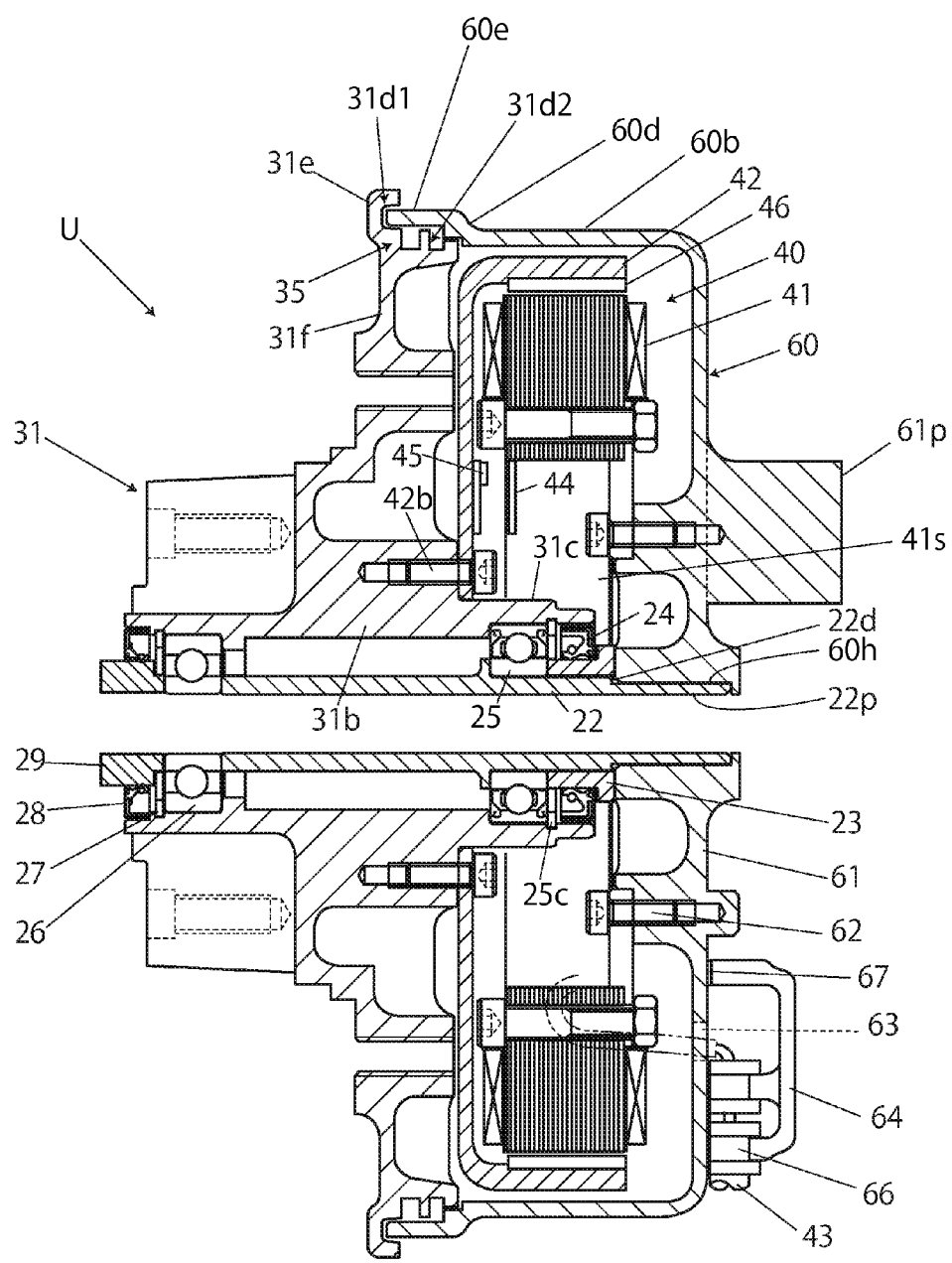
FIG. 3 is a sectional view, on an enlarged scale of FIG. 2, showing a unit.

Referring to FIGS. 2 and 3, reference numeral 40 indicates the motor.

The motor 40 has a stator 41 and a rotor 42 and forms a drive source of the front wheel 30. On a wheel axle 21 is rotatively supported the front wheel 30 between the pair of left and right arms, or the left and right front forks 20L and 20R for this embodiment. The motor 40 is disposed inside a hub of the front wheel 30.

The front wheel 30 is provided with a braking mechanism 50. The braking mechanism 50 is disposed on one side (on the left in FIG. 2) away from a vehicle body center C, as seen from the front of the vehicle body as shown in FIG. 2. Meanwhile, the motor 40 is disposed on the other side (on the right in FIG. 2) away from the vehicle body center C. For this embodiment, the braking mechanism 50, more specifically, a braking part 52 generating a braking force and a braked unit 51 receiving the thus generated braking force, as described later, are disposed on one side away from the vehicle body center C in between the front forks 20L and 20R, and the motor 40 is disposed on the other side away from the vehicle body center C in between the front forks 20L and 20R, as seen from the front of the vehicle body.

The front wheel 30 has a fixed-side member 60 supporting the stator 41 of the motor 40 and a wheel hub 31 as a rotative-side member receiving rotation transmitted from the rotor 42. The front wheel 30 is driven by means of driving of the motor 40 through the wheel hub 31. The front wheel 30 is fixed to the wheel hub 31 with a stud bolt 33.

The rotor 42 and the rotative-side member 31 are both rotatively supported on an axle 22. For this embodiment, the axle 22 is of the form of a cylindrical axle collar 22 into which the wheel axle 21 is inserted. Thus, the axle 22 will be hereinafter also referred to as the axle collar 22.

There is provided, at a fixed-side member 60-side end of the axle collar 22, an engaging part 22p for engagement with the fixed-side member 60 to position the center of rotation of the rotative-side member 31 with respect to the fixed-side member 60. The engaging part 22p may be of the form of a small-diameter part formed through a step 22d (see FIG. 3). A fixed-side member 60-side engaging part may be of the form of a hole 60h into which the above small-diameter part 22p is inserted.

As shown in FIG. 3, the rotative-side member 31 and the fixed-side member 60 may be integrated into a unit by engagement of the engaging part 22p of the axle collar 22 with the fixed-side member 60 (or by fitting the small-diameter part 22p into the hole 60h of the fixed-side member 60 for this embodiment). A unit U of which will be supported between the pair of arms 20L and 20R with the wheel axle 21 inserted into the axle collar 22, as shown in FIG. 2.

The rotative-side member 31 has a sleeve 31b rotatively supported on the axle collar 22 and a flange 31f provided on the outer circumference of the sleeve 31b. To the flange 31f is fastened the rotor 42 with a socket bolt 42b. Thus, the rotor 42 is supported with the rotative-side member 31.

The sleeve 31b of the rotative-side member 31 is more projecting with respect to the axial direction thereof (leftward and rightward in FIGS. 2 and 3) toward the fixed-side member 60 than a part where the rotor 42 is fastened, a projection 31c of which is supported on the axle 22 through a bearing 25. It is noted that the other end side of the sleeve 31b is rotatively supported on the wheel axle 21 through a bearing 26.

The rotor 42 is of the form of an outer rotor located on the outer circumference of the stator 41. The rotor 42 is comprised of a member having an approximately channel-shaped section as a whole and has on its inside surface facing the stator 41 a magnet 46. To the flange 31f of the rotative-side member 31 is fixed a center portion of the rotor 42 with the above socket bolt 42b.

Meanwhile, the stator 41 is of a doughnut form having a space 41s (see FIG. 3) in the center of the stator, wherein in the space 41s is disposed the projection 31c of the sleeve 31b included in the rotative-side member 31.

Figure 4:
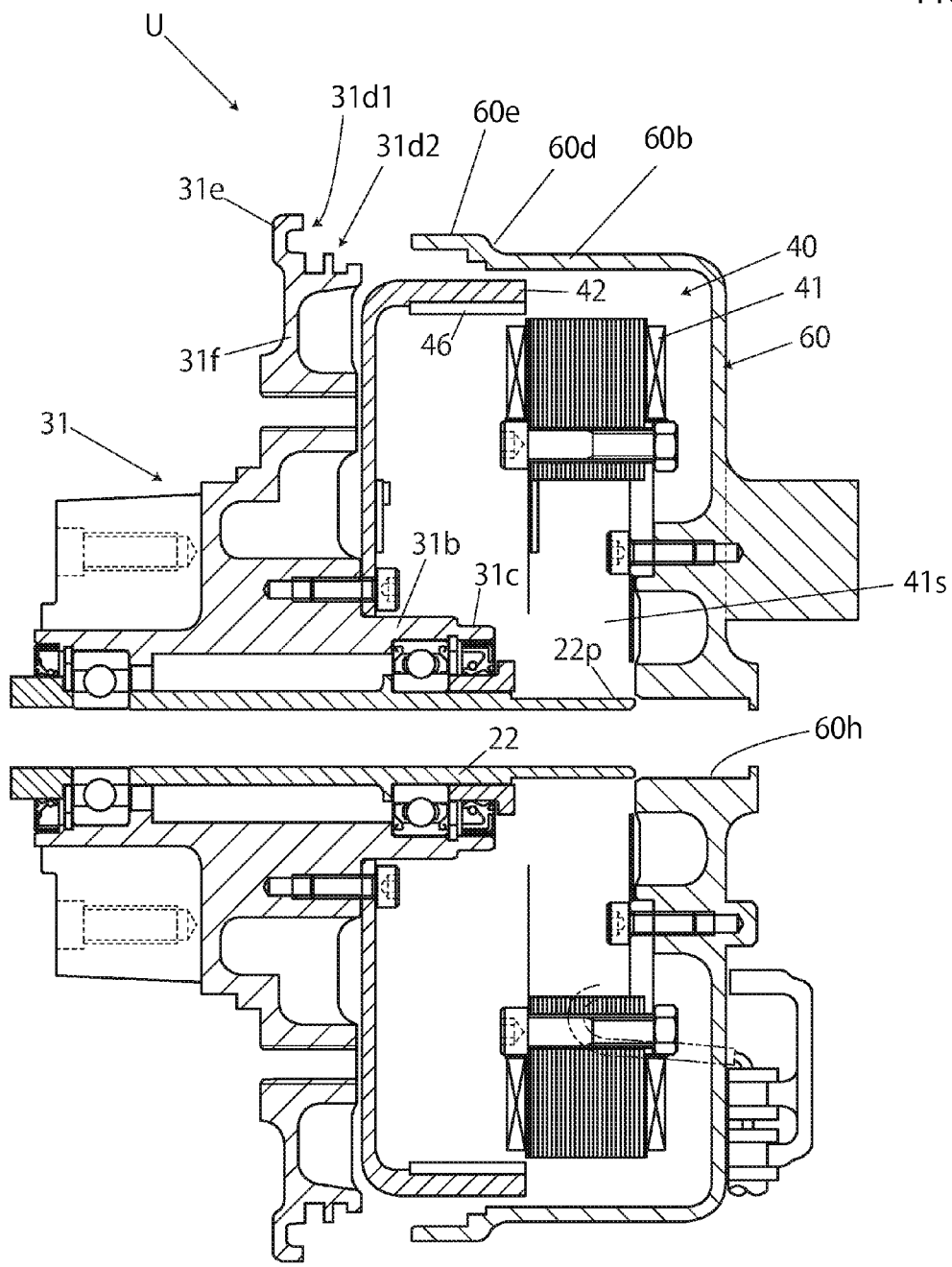
FIG. 4 illustrates an operating state.

FIG. 4 is a view showing the state in which the engaging part 22p of the axle collar 22 has started making engagement with the engaging part 60h of the fixed-side member 60 in the course of integration into the unit U.

As explicitly shown in FIG. 4, the engaging part 22p of the axle collar 22 is more projecting with respect to the axial direction thereof toward the fixed-side member 60 than the projection 31c of the sleeve 31b included in the rotation-side member 31. Engagement of the engaging part 22p with the engaging part 60h of the fixed-side member 60 is provided before the rotor and the stator 41 are overlapped (more exactly, before attraction force caused by magnetic attraction produced between the rotor 42 and the stator 41 becomes so increased that operation of engagement of the engaging part 22p of the axle collar 22 with the engaging part 60h of the fixed-side member 60 is hard to be effected) when bringing axially closer to each other the rotative-side member 31 supporting the rotor 42 and the fixed-side member 60 supporting the stator 41 for integration into the unit, as shown in FIG. 4.

As shown in FIGS. 2 and 3, the fixed-side member 60 has a disk 61 fixed to one of the pair of arms 20L and 20R, i.e., the arm 20L and a cylindrical part 60b so extending from the circumference of the disk 61 to the rotative-side member 31-side as to cover the stator 41 and the rotor 42. An annular end 60e of the cylindrical part 60b and an outer circumference 31e of the flange 31f included in the rotative-side member 31 are brought into an overlap on a center line C of the vehicle as shown in FIG. 2, an overlap portion of which is adapted to form a labyrinth seal 35.

As shown in FIGS. 3 and 4, the labyrinth seal 35 is composed of the above annular end 60e having a diameter increasing toward the rotative-side member 31-side through a step 60d in the cylindrical part 60b of the fixed-side member 60 and an axially-extending ring-shaped irregularity 31d1 and a radially-extending irregularity 31d2, both irregularities being provided on the outer circumference 31e of the flange 31f included in the rotative-side member 31.

As shown in FIG. 2, the above wheel axle 21 is of the form of an axle bolt and is fixed to the ends of the front forks 20L and 20R with an axle nut 21n.

On the wheel axle 21 are mounted, right-to-left in FIG. 2, the fixed-side member 60, the axle color 22, a side collar 23, the ball bearings 25 and 26 and a side color 29, all of which being fastened together and secured in position between the front forks 20L and 20R with the axle nut 21n.

There are mounted oil seals 24, 28 respectively between the sleeve 31b included in the rotative-side member 31 and the side colors 23 and 29. This arrangement is adapted to prevent water and/or dust or the like from entering into the sleeve 31b.

To the sleeve 31b are attached circlips 25c and 27 to regulate the axial movement of the sleeve relative to the ball bearings 25 and 26.

As shown in FIG. 2, there are integrally provided a convex part 61p on the outside of the fixed-side member 60, wherein engagement of the convex part 61p with the front fork 20L is adapted to surely prevent the fixed-side member 60 from being moved about the wheel axle 21 and the axle collar 22.

To the inside of the fixed-side member 60 is fixed the stator 41 of the motor 4 with the socket bolt 62.

Referring to FIGS. 1 and 2, reference numeral 43 indicates a power line of the motor 40. There is provided in the fixed-side member 60 a hole 64 for drawing out the power line 43 outward of the fixed-side member 60. The power line 43 drawn out through the hole 63 is supported on a cover 64 through a grommet 66 and is further connected to a non-illustrated motor battery serving as a power supply. The battery is mounted on the vehicle body frame 11. The cover 64 is secured to the outside of the fixed-side member 60 with a bolt 65 (see FIG. 1) in order to block up the hole 63. There is provided a gasket 67 between the cover 64 and the outside of the fixed-side member 60, so that the inside of the cover 64 is held in an airtight state with the gasket 67 and the grommet 66. Accordingly, water or the like may be prevented from entering into the fixed-side member 60 through the hole 63.

There is provided inside the fixed-side member 60 a magnetic sensor 44 located inside the stator 41, and the magnetic sensor 44 is adapted to provide detection of rotation of the rotor 42 by means of sensing of a magnet 45 provided on the rotor 42. A signal line (not shown) of the magnetic sensor is drawn out in the same manner as the power line 43 and is connected to a control device included in this motorcycle 10.

It is noted that referring to FIG. 2, there is shown the downwardly drawn-out power line 43, which is that given by means of development of a section in FIG. 1, and, as a matter of fact, the power line 43 is of the form of an upwardly drawn-out power line as shown in FIG. 1.

In a portion of the fixed-side member 60 other than the overlap portion of the fixed-side member overlapped with the rotative-side member (the wheel hub) 31, wiring (the power line 43 and the signal line) for the motor 40 may be inserted through the fixed-side member 60. For this embodiment, the wiring is inserted, at the rear of the front fork 20L, through the hole 63 of the fixed-side member 60, followed by being arranged along the front fork 20L, as shown in FIG. 1. The power line 43 and the signal line are both connected to the control device (not shown) mounted in its proper position of the vehicle body frame 11.

As shown in FIG. 2, the braking mechanism 50 has the braked part 51 fixed to the wheel hub 31 and rotated together with the wheel hub 31 (i.e., the front wheel 30) and the braking unit 52 braking rotation of the braked unit 51. For this embodiment, the braked unit 51 is of the form of a brake disk fixed to the outside of the wheel hub 31 with the bolt 53, and the braking unit 52 is of the form of a caliper fixed to the front fork 20R. The braking unit 52 and the braked unit 51 are both located between the front forks 20L and 20R. The caliper 52 used may be of a well-known structure and thus has a pair of brake pads 54 applying pressure to pinch the brake disk 51 from the opposite sides thereof for braking.

According to the vehicle 10 equipped with the driving motor as described the above, the following functions and effects will be given.

(a) There is provided, at the axle 22 supporting rotatively both the rotor 42 and the rotative-side member 31, the engaging part 22p for engagement with the fixed-side member 60 to position the center of rotation of the rotative-side member 31 with respect to the fixed-side member 60, so that, as shown in FIG. 3, integration of the rotative-side member 31 and the fixed-side member 60 into the unit by engagement of the engaging part 22p with the fixed-side member 60 is adapted to allow the axle 22 to be positioned with respect to the fixed-side member 60, resulting in that the centers of the holes in both the fixed-side member and the axle for insertion of the wheel axle 21 will be in alignment.

Accordingly, operation of incorporating the unit U (i.e., the wheel 30) in between the pair of arms 20L and 20R becomes facilitated.

(b) The rotor 42 is supported with the rotative-side member 31, so that it is possible to position also the center of rotation of the rotor 42 with respect to the stator 41 supported on the fixed-side member 60 at the same time as positioning of the center of rotation of the rotative-side member 31 with respect to the fixed-side member 60.

(c) The rotative-side member 31 has the sleeve 31b rotatively supported on the axle 22 and the flange 31f provided on the outer circumference of the sleeve 31b, wherein to the flange 31f is fastened the rotor 42, and the sleeve 31b is formed more projecting with respect to the axial direction thereof than the part where the rotor 42 is fastened, the projection 31c of which is supported on the axle 22 through the bearing 25, so that it is possible to support in a stable state the rotative-side member 31 holding a tire T (see FIG. 2) and the rotor 42.

(d) The rotor 42 is of the form of the outer rotor located on the outer circumference of the stator 41, and the stator 41 is of the doughnut form having the space 41s in the center of the stator, wherein in the space 41s is disposed the projection 31c of the sleeve 31b included in the rotative-side member 31, so that it is possible to provide the size reduction of the wheel 30 by effectively taking advantage of the space 41s in the center of the stator 41.

(e) The engaging part 22p of the axle 22 is formed more projecting with respect to the axial direction thereof toward the fixed-side member 60 than the projection 31c of the sleeve 31b included in the rotative-side member 31, wherein engagement of the engaging part 22p with the fixed-side member 60 is provided (or engagement is started) before the rotor 42 and the stator 41 are overlapped as shown in FIG. 4 when bringing axially closer to each other the rotative-side member 31 supporting the rotor 42 and the fixed-side member 60 supporting the stator 41, so that it is possible to bring the engaging part 22p into engagement with the fixed-side member 60 before the magnetic attraction produced between the rotor 42 and the stator 41 becomes increased. As a result, integration into the unit may be effected easily.

(f) The fixed-side member 60 is of the form having the disk 61 fixed to one of the pair of arms 20L and 20R, i.e., the arm 20R and the cylindrical part 60b so extending from the circumference of the disk 61 to the rotative-side member 31-side as to cover the stator 41 and the rotor 42, wherein the annular end 60e of the cylindrical part 60b and the rotative-side member 31 are brought into the overlap on the center line C of the vehicle, so that it becomes possible to form the labyrinth seal 35 in such a position that water or the like is hard to enter.

(g) The above labyrinth seal 35 is formed in such a manner that there is provided at the annular end 60e of the cylindrical part 60b the step 60d having the diameter increasing toward the rotative-side member 31-side, while there are provided on the rotative-side member 31 the axially-extending irregularity 31d1 and the radially-extending irregularity 31d2, so that it is possible to provide an increased seal property.

Figure 5:
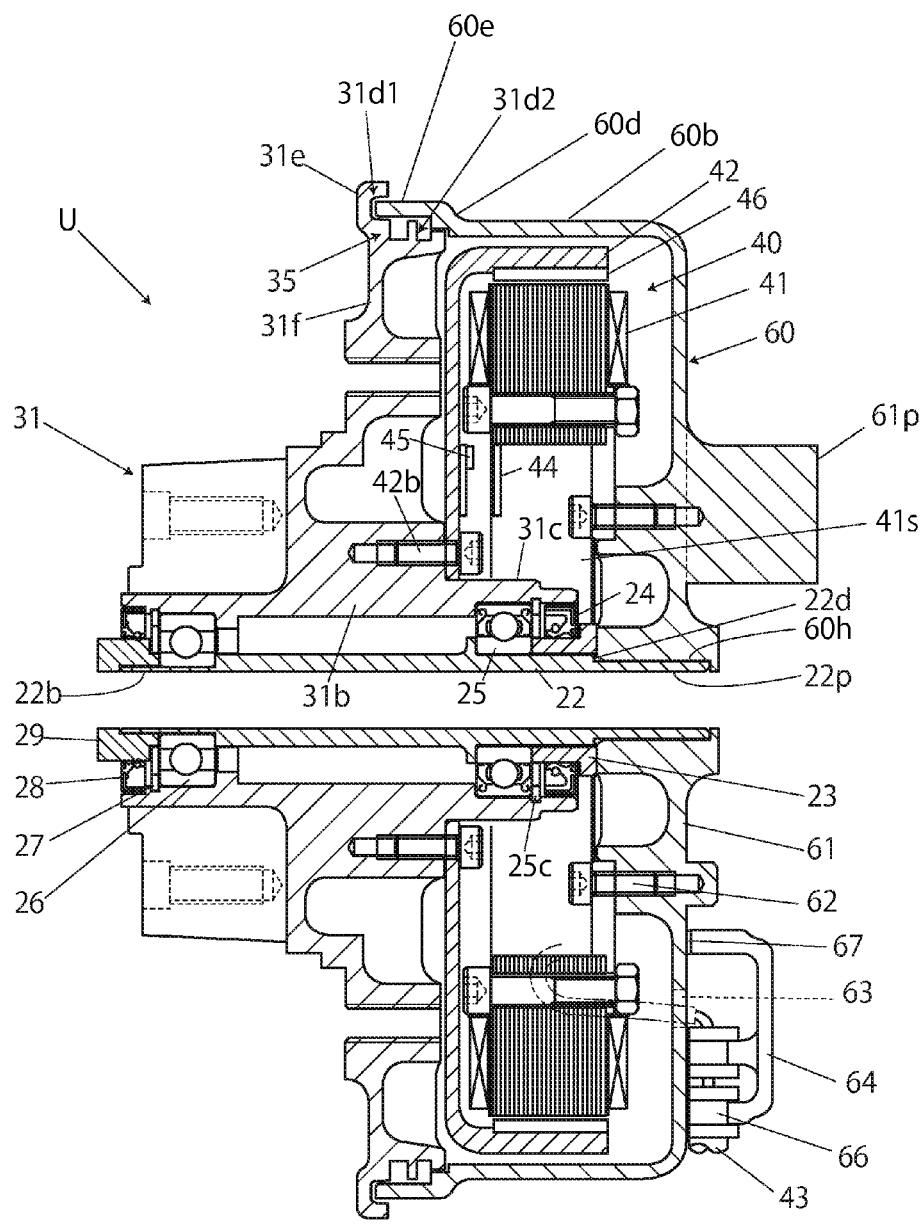
FIG. 5 is a sectional view showing one modification of the unit.

FIG. 5 is a sectional view showing one modification of the unit U.

The illustrated unit U is characterized in that the axle 22 (the axle collar) 22 has an end 22b formed as an extended part 22b in the form of a small-diameter cylindrical part, wherein engagement of the extended part 22b with the ball bearing 26 and the side collar 29 is adapted to allow the axle collar 22 to be positioned with respect to the ball bearing 26 and the side collar 29.

Application of such arrangement allows for more smooth insertion of the wheel axle 21 into the axle collar 22, together with sure positioning of the center of rotation of the rotative-side member 31 with respect to the axle collar 22.

Accordingly, the operation of incorporating the unit U (i.e., the wheel 30) in between the pair of arms 20L and 20R becomes more facilitated.

While the embodiment of the present invention has been described, it is to be understood that the present invention is not limited to the above embodiment, and any appropriate modifications and changes of the present invention are possible within the spirit and scope of the present invention.

INDUSTRIAL APPLICABILITY

The vehicle equipped with the driving motor according to the present invention provides facilitated operation of incorporating in between the pair of arms the wheel equipped with the unit including the driving motor, so that such facilitated incorporating operation is thus applicable for use in manufacturing the vehicle with the driving motor incorporated in the wheel.

REPRESENTATION OF REFERENCE NUMERALS

C: Vehicle body center
U: Unit
10: Vehicle
11: Vehicle body
20: Arm (Front fork)
21: Wheel axle
22: Axle (Axle collar)
22p: Engaging part
30: Wheel (Front wheel)
31: Rotative-side member (Wheel hub)
31b: Sleeve
31f: Flange
31e: Annular end
35: Labyrinth seal
40: Motor
41: Rotor
42: Stator
50: Braking mechanism
60: Fixed-side member
60b: Cylindrical part
61: Disk

The invention claimed is:

1. A vehicle comprising:
a driving motor, in which a wheel provided therein with a motor having a stator and a rotor and equipped with a fixed-side member supporting said stator and a rotative-side member receiving rotation transmitted from said rotor is supported between a pair of arms with a wheel axle, wherein on an axle are rotatively supported said rotor and the rotative-side member, and there is provided at said axle an engaging part for engagement with said fixed-side member to position the center of rotation of the rotative-side member with respect to said fixed-side member, said rotative-side member and said fixed side member are integrated into a unit by engagement of the engaging part of the axle with said fixed-side member, the unit of which is supported between said pair of arms with said wheel axle, said rotor is supported with said rotative-side member, and said rotative-side member has a sleeve rotatively supported on said axle, and said sleeve is formed more projecting with respect to the axial direction thereof than a part where said rotor is fastened, a projection of which is supported on said axle through a bearing.

2. The vehicle equipped with the driving motor according to claim 1, wherein a flange is provided on the outer circumference of the sleeve, wherein to said flange is fastened said rotor.

3. The vehicle equipped with the driving motor according to claim 2, wherein said rotor is of the form of an outer rotor located on the outer circumference of said stator, and said stator is of a doughnut form having a space in the center of said stator, wherein in said space is disposed the projection of the sleeve included in said rotative-side member.

4. The vehicle equipped with the driving motor according to claim 2, wherein the engaging part of said axle is more projecting with respect to the axial direction thereof toward said fixed-side member than the projection of the sleeve included in said rotative-side member, wherein engagement of said engaging part with the fixed-side member is provided before said rotor and said stator are overlapped when bringing axially closer to each other the rotative-side member supporting said rotor and the fixed-side member supporting said stator.

5. The vehicle equipped with the driving motor according to claim 1, wherein said fixed-side member has a disk fixed to one of said pair of arms and a cylindrical part so extending from the circumference of the disk to the rotative-side member side as to cover said stator and said rotor, wherein an annular end of said cylindrical part and said rotative-side member are brought into an overlap on the center line of the vehicle, an overlap portion of which is adapted to form a labyrinth seal.

6. The vehicle equipped with the driving motor according to claim 5, wherein said labyrinth seal is formed in such a manner that there is provided at the annular end of said cylindrical part a step having a diameter increasing toward said rotative-side member side, while there are provided on said rotative-side member an axially-extending irregularity and a radially-extending irregularity.

* * * * *